United States Patent
Farrugia et al.

(10) Patent No.: US 11,851,536 B2
(45) Date of Patent: Dec. 26, 2023

(54) PRECIPITATION PROCESS FOR PREPARING POLYSTYRENE MICROPARTICLES

(71) Applicant: Xerox Corporation, Norwalk, CT (US)

(72) Inventors: Valerie M. Farrugia, Oakville (CA); Edward G. Zwartz, Mississauga (CA); Sandra J. Gardner, Oakville (CA)

(73) Assignee: Xerox Corporation, Norwalk, CT (US)

( * ) Notice: Subject to any disclaimer, the term of this patent is extended or adjusted under 35 U.S.C. 154(b) by 1034 days.

(21) Appl. No.: 16/149,320

(22) Filed: Oct. 2, 2018

(65) Prior Publication Data

US 2020/0102427 A1    Apr. 2, 2020

(51) Int. Cl.
*C08J 3/14* (2006.01)
*B29C 64/153* (2017.01)
(Continued)

(52) U.S. Cl.
CPC ............. *C08J 3/14* (2013.01); *B29C 64/153* (2017.08); *C08F 12/08* (2013.01); *B29K 2025/06* (2013.01); *B33Y 70/10* (2020.01); *C08F 2500/01* (2013.01); *C08F 2500/05* (2013.01); *C08F 2500/24* (2013.01); *C08J 2325/06* (2013.01)

(58) Field of Classification Search
CPC ... B29C 64/153; B29K 2025/06; B33Y 10/00; B33Y 70/00; C08F 12/08; C08F 2500/01; C08F 2500/05; C08F 2500/24; C08J 2325/06; C08J 3/14
See application file for complete search history.

(56) References Cited

U.S. PATENT DOCUMENTS

| | | | |
|---|---|---|---|
| 4,137,388 A | * | 1/1979 | Cutter ............... C08F 12/08 526/73 |
| 4,927,535 A | | 5/1990 | Beck et al. |

(Continued)

OTHER PUBLICATIONS

J.E. Eldridge, "Effect of the Thermal History of Polymers on Their Dynamic Mechanical Properties", 1967, Journal of Applied Polymer Science, vol. 11 (Year: 1967).*

(Continued)

*Primary Examiner* — Xiao S Zhao
*Assistant Examiner* — Victoria Bartlett
(74) *Attorney, Agent, or Firm* — Marylou J. Lavoie, Esq. LLC

(57) ABSTRACT

A process including combining polystyrene and a first solvent to form a polystyrene solution; heating the polystyrene solution; adding a second solvent to the polystyrene solution with optional stirring whereby polystyrene microparticles are formed via microprecipitation; optionally, cooling the formed polystyrene microparticles in solution; and optionally, removing the first solvent and second solvent. A polystyrene microparticle formed by a microprecipitation process, wherein the polystyrene particle has a spherical morphology, a particle diameter of greater than about 10 micrometers, and a weight average molecular weight of from about 38,000 to about 200,000 Daltons. A method of selective laser sintering including providing polystyrene microparticles formed by a microprecipitation process; and exposing the microparticles to a laser to fuse the microparticles.

17 Claims, 17 Drawing Sheets

(51) Int. Cl.
  C08F 12/08 (2006.01)
  B29K 25/00 (2006.01)
  B33Y 70/10 (2020.01)

(56) References Cited

U.S. PATENT DOCUMENTS

| | | | |
|---|---|---|---|
| 5,169,893 | A | 12/1992 | Beck |
| 7,217,762 | B1 * | 5/2007 | Jorgedal ............... C08F 257/02 |
| | | | 524/800 |
| 9,757,901 | B2 | 9/2017 | Greger et al. |
| 9,782,932 | B2 | 10/2017 | Roels et al. |
| 9,908,977 | B2 | 3/2018 | Farrugia et al. |
| 2008/0221228 | A1 * | 9/2008 | Notari ..................... C08J 11/08 |
| | | | 521/47 |
| 2018/0022043 | A1 | 1/2018 | Keoshkerian et al. |

OTHER PUBLICATIONS

Goodridge, R.D., "Laser sintering of polyamides and other polymers" May 17, 2011 (Year: 2011).*

Garcia, Maria Teresa, "Study of the solubility and stability of polystyrene wastes in a dissolution recycling process", Feb. 12, 2009 (Year: 2009).*

Wypych, George "PS -Polystyrene" 2012, Handbook of Polymers (Year: 2012).*

N. Mys et al., Spray Drying as a Processing Technique For Syndiotactic Polystyrene to Powder Form For Part Manufacturing Through Selective Laser Sintering, The Minerals, Metals & Materials Society, JOM, vol. 69, No. 3, 2017, published online Nov. 14, 2016.

Coathylene® Fine Powders Information Sheet, Version May 2015.

Coathylene® Polymer Powders Information Sheet, Version Apr. 2014.

C.W. Ku et al., Selective Laser Sintered CastForm™ Polystyrene With Controlled Porosity and Its Infiltration Characteristics By Red Wax, Department of Mechanical Engineering, The University of Hong Kong, 13th Solid Freeform Fabrication Symposium, 2002, Austin Texas, University of Texas at Austin.

Marcelo K. Lenzi et al., Producing Multimodal MWD Polymer Resins Using Living and Conventional Free-Radical Polymerizations, Proceedings of the 8 Brazilian Congress on Polymers, Nov. 2005, Brazil.

Chung-Sung Tan et al., Precipitation of Polystyrene By Spraying Polystyrene-Toluene Solution Into Compressed HFC-134a, American Chemical Society, published on Web Sep. 3, 1999.

* cited by examiner

| No. | Max Diameter | Area | Peri |
|---|---|---|---|
| 1 | 105μm | 4102μm2 | 2 |
| 2 | 109μm | 6138μm2 | 3 |
| 3 | 118μm | 6945μm2 | 3 |
| 4 | 130μm | 10855μm2 | 3 |
| 5 | 148μm | 10663μm2 | 4 |
| Average | 91μm | 6226μm2 | 287 |
| Standard Deviation | 31μm | 5162μm2 | 102 |
| Max | 313μm | 68771μm2 | 1071 |
| Min | 43μm | 1302μm2 | 142 |
| Total | 35414μm | 2434420μm2 | 112380 |

| Area | |
|---|---|
| Total Area | 2434420μm2 |
| Full Area | 8195653μm2 |
| Area ratio | 30 % |

Count: 391 pcs

FIG. 8A

| No. | Max Diameter | Area | Peri |
|---|---|---|---|
| 1 | 304μm | 52179μm2 | 9 |
| 2 | 299μm | 39023μm2 | 8 |
| 3 | 387μm | 101775μm2 | 18 |
| 4 | 307μm | 71665μm2 | 10 |
| 5 | 261μm | 52042μm2 | 8 |

| | | | |
|---|---|---|---|
| Average | 283μm | 60335μm2 | 920 |
| Standard Deviation | 65μm | 30036μm2 | 223 |
| Max | 537μm | 215994μm2 | 1767 |
| Min | 144μm | 14616μm2 | 459 |
| Total | 19560μm | 418089μm2 | 63454 |

| Area | |
|---|---|
| Total Area | 4163089μm2 |
| Full Area | 8195653μm2 |
| Area Ratio | 51% |

Count: 69 pcs

FIG. 10A

|  | EXAMPLE 1 | EXAMPLE 2 |
|---|---|---|
| LASER POWER (LP) | 60% | 60% |
| LASER RATE (LR) | 30,000 | 30,000 |
| COMMENT | SINTERED, ROBUST ENOUGH TO REMOVE POWDER ON UNDERSIDE | SINTERED BUT FRAGILE, WAS STILL ABLE TO LIFT UP FROM ALUMINIUM PLATE |
| IMAGE OF SINTERED PART | | |
| PART DIMENSIONS (BASED ON 30 mm BY 30 mm PART) | 30.451 x 30.606 NO SHRINKAGE OCCURED | NOT INTACT ENOUGH TO MEASURE |
| IMAGE OF SINTERED PART FOR DIMENSION MEASUREMENT | 1[30451μm] 2[30606μm] 500μm | |
| OPTICAL MICROGRAPH (50x) | 500μm | 500μm |
| OPTICAL MICROGRAPH (200x) | 500μm | 500μm |

FIG. 13

PRECIPITATION PROCESS FOR PREPARING POLYSTYRENE MICROPARTICLES

BACKGROUND

The present disclosure is directed to a process for preparing microparticles particularly suitable as build material for additive manufacturing processes, the process comprising combining polystyrene and a first solvent to form a polystyrene solution; heating the polystyrene solution; adding a second solvent to the polystyrene solution with optional stirring whereby polystyrene microparticles are formed via microprecipitation; optionally, cooling the formed polystyrene microparticles in solution; and optionally, removing the first solvent and second solvent.

The present disclosure is further directed to a polystyrene microparticle formed by a microprecipitation process, wherein the polystyrene particle has a spherical morphology, a particle diameter of greater than about 10 micrometers, and a weight average molecular weight of from about 38,000 to about 200,000 Daltons.

The present disclosure is further directed to a method of selective laser sintering comprising providing polystyrene microparticles formed by a microprecipitation process; and exposing the microparticles to a laser to fuse the microparticles.

Additive manufacturing (also known as three dimensional printing) as practiced in industry has been to date, mostly concerned with printing structural features. The main materials used are thermoplastics that offer form but not function. There is great interest in the field to develop improved materials that can be used to easily print completely integrated functional objects with limited post-assembly. This would allow completely new designs in the manufacturing and consumption of everyday objects, particularly when they can be enabled with conductive materials. The capability of printing conductive components within an object can provide the potential for embedded sensors and electronics.

Selective laser sintering (SLS) is a powder bed based additive manufacturing technique to produce complex three-dimensional parts. In SLS, a rasterized laser is used to scan over a bed of polymer powder, sintering it to form solid shapes in a layer-wise fashion. When the laser beam scans the powder, the powder melts due to the rising temperature, and layer by layer, the final part approaches full density and should result in properties of the bulk material (that is, the polymer). In theory, every thermoplastic polymer that can be transformed into a powder form can be processed via this technique, but the reality is that every material behaves differently, often unpredictably, during melting, coalescence, and consolidation, and often requires unique SLS processing parameters. The bed temperature and laser energy input, for example, can be selected based on the processing window of the polymer's thermal profile as well as its energy absorption. Laser parameters can also be selected based on the powder's particle size and shape.

Functionality to three dimensional objects can potentially be imparted by including one or more additional components to the polymer powders used in SLS printing. However, incorporating these components for three dimensional printing has been a challenge. The material used for SLS is typically powdered nylon (polyamide) with particle sizes ranging from about 100 to about 300 microns. The polymer particulates can be used either alone or in composite form (with additives such as glass particles, carbon fiber, etc.). Where composites are used, the additives are not intimately mixed with the polymer, which affects the final properties of the three dimensional object. Furthermore, sufficiently high loadings of composites for increased conductivity are difficult to mix in.

FIG. 1 shows a selection of thermoplastic polymers. Of the polymers shown, PEEK (polyether ether ketone), PC (polycarbonate), PA (polyamide), POM (polyoxymethylene), PMMA (polymethyl methacrylate), PS (polystyrene), and PE-HD (polyethylene-high density) have been used in SLS. The availability of powder materials for SLS is limited. About 95 percent of the SLS materials market consists of polyamide-12, which is a crystalline nylon grade polymer. Amorphous materials such as polycarbonate and polystyrene have proven less successful and are not readily available.

Unlike semi-crystalline polymer powders, amorphous polymer powder must be heated above the glass transition temperature, at which the polymer is in a much more viscous state then semi-crystalline polymers at similar temperatures. Semi-crystalline polymers are highly ordered molecules with sharp melting points (Tm). Unlike amorphous polymers, semi-crystalline polymers do not gradually soften as the temperature increases but instead remain hard until a given amount of heat is absorbed and then rapidly transform into a viscous liquid. When semi-crystalline material is above the Tm, they have a very low viscosity and will flow and overlap with other sintered layers with rapid cooling. Amorphous polymers, on the other hand, will gradually soften as the temperature is increased but are not as easy flowing as semi-crystalline materials. The flow and sintering rate of amorphous powders would be less and blending between sintered layers would be more hindered and highly porous.

Polystyrene, an amorphous polymer, is known to have a low shrinkage rate making it a good candidate for a build material in SLS processing. Polystyrene also has excellent solvent resistance, good electrical properties (low dielectric constant), and is a light, low warpage material. Along with its high dimensional accuracy, polystyrene is relatively cheap to synthesize or purchase in pellet form.

However, there is not currently a suitable method for processing polystyrene from bulk or pellet to the required specifications for a SLS commercial powder. The formation of microparticles by chemical means can be quite difficult. Most often, polystyrene is processed into powder form using mechanical techniques (ball milling, rotor milling) and physicochemical techniques (spray drying). Rotor milling and spray drying techniques will achieve spherical powders, yet only rotor milling tends to achieve particles with a mean diameter within a range suitable for SLS, for example, in a range of from about 45 to about 97 micrometers. FIG. 2 shows results of syndiotactic polystyrene pellets processed into powder form using mechanical (ballmilling, rotor milling) and physicochemical (spray drying) techniques. See Mys et al., Processing of Syndiotactic Polystyrene to Microspheres for Part Manufacturing through Selective Laser Sintering, Polymers 2016, 8, 383; doi: 10.3390/polym8110383, which is hereby incorporated by reference herein in its entirety. The ball milling technique often leads to particles with too wide a distribution and undesired morphology.

In embodiments, the particle size distribution is favorable if between 20 to 80 microns with a median of about 50 microns. In embodiments, the polystyrene microspheres have a particle size distribution with a lower number ratio geometric standard deviation (GSD) of from about 1.0 to about 4.0, from about 1.1 to about 3.0, or from about 1.2 to about 2.0. If there are a high percentage of small particles, which can be easily distinguished from the number distribution, particle stickiness results. The enhanced adhesion between particles reduces the ability of the powder to flow freely and thereby prevents SLS processability. Particles made by cryogenic milling result in a high amount of fine or small particles which result in unsuccessful SLS processing. If the particles are larger than the thickness of the laser or spot size, the particles will be unable to sinter together.

Most of these methods also consume a lot of time and waste large amounts of material. Some physicochemical methods like thermal-induced phase separation (TIPS), diffusion-induced phase separation (DIPS), evaporation phase separation (EPS) and spray drying (SD) tend to achieve spherical particles as well but require large amounts of non-solvents to induce the phase separation. Other issues with DIPS and TIPS is that the particle size of the powders is too small, from 1 to 3 micrometers, and agglomeration is also difficult to control.

U.S. Patent Publication 2018/0022043, which is hereby incorporated by reference herein in its entirety, describes in the Abstract thereof a method of selective laser sintering. The method comprises providing composite particles made by emulsion aggregation, the composite particles comprising at least one thermoplastic polymer and at least one carbon particle material. The composite particles are exposed to a laser to fuse the composite particles.

There is currently no known supplier of polystyrene powder on the market aimed directly for SLS or three-dimensional printing. Velox, a distributor of Axalta® Polymer Powders' Coathylene® range, purport to have a few polystyrene powders available. See Products Guide Coathylene® ultra fine powders, which is hereby incorporated by reference herein in its entirety. There is a SB 0425 grade which has a stated particle size range of 45 to 60 micrometers which is considered to be an ultra-fine powder. Two milled polystyrene powders are stated, SL 0425 having a particle size range of 150 to 210 micrometers, and SM 0425 having a particle size range of 200 to 250 micrometers. The materials are stated to be a substitution for styrene granules. Coathylene® SL 0425 is stated to be a polystyrene powder which can partially substitute liquid styrene as an antishrink additive. Instead of time consuming pre-mix and dissolution steps of polystyrene granules in styrene for low shrink formulations, Coathylene® SL 0425 is said to easily replace polystyrene granules. Around 75 percent of the dissolution time can be avoided simply by mixing a Coathylene® SL 0425/liquid styrene resin compound according to the product guide.

Commercial grade polystyrene exists for investment casting applications. Parts made from these amorphous polymers, such as DTM CastForm™ polystyrene, do not show full consolidation since they are lower in density and quite porous. The parts undergo post-processing, such as wax infiltration, to increase the density, dimensional accuracy, and strength of the CastForm™ parts. FIG. 3 is an SEM (scanning electron micrograph) of DTM CastForm™ polystyrene raw powder. See, Ku et al., Selective laser sintered cast form polystyrene with controlled porosity and its infiltration characteristics by red wax, Proceedings of the 13$^{th}$ Solid Freeform Fabrication Symposium, 2011, pages 107-114, which is hereby incorporated by reference herein in its entirety.

While currently available SLS materials may be suitable for their intended purposes, there remains a need for improved SLS materials and processes. Further, a need remains for additional powder materials for SLS. Still further, a need remains for polystyrene materials having specifications suitable for use in SLS. Still further, a need remains for processes for preparing polystyrene wherein the resultant polystyrene is suitable for use in SLS and other three-dimensional printing applications.

The appropriate components and process aspects of the each of the foregoing U.S. patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a process comprising combining polystyrene and a first solvent to form a polystyrene solution; heating the polystyrene solution; adding a second solvent to the polystyrene solution with optional stirring whereby polystyrene microparticles are formed via microprecipitation; optionally, cooling the formed polystyrene microparticles in solution; and optionally, removing the first solvent and second solvent.

Also described is a polystyrene microparticle formed by a microprecipitation process, wherein the polystyrene particle has a spherical morphology, a particle diameter of greater than about 10 micrometers, and a weight average molecular weight of from about 38,000 to about 200,000 Daltons.

Also described is a method of selective laser sintering comprising providing polystyrene microparticles formed by a microprecipitation process; and exposing the microparticles to a laser to fuse the microparticles.

BRIEF DESCRIPTION OF THE DRAWINGS

FIG. 8A is an image analysis of polystyrene microparticles prepared in accordance with the present embodiments.

FIG. 10A is an image analysis of polystyrene microparticles prepared in accordance with the present embodiments.

FIG. 13 is an illustration of a sintered part prepared with polystyrene microparticles prepared in accordance with the present embodiments.

DETAILED DESCRIPTION

Figure 1:
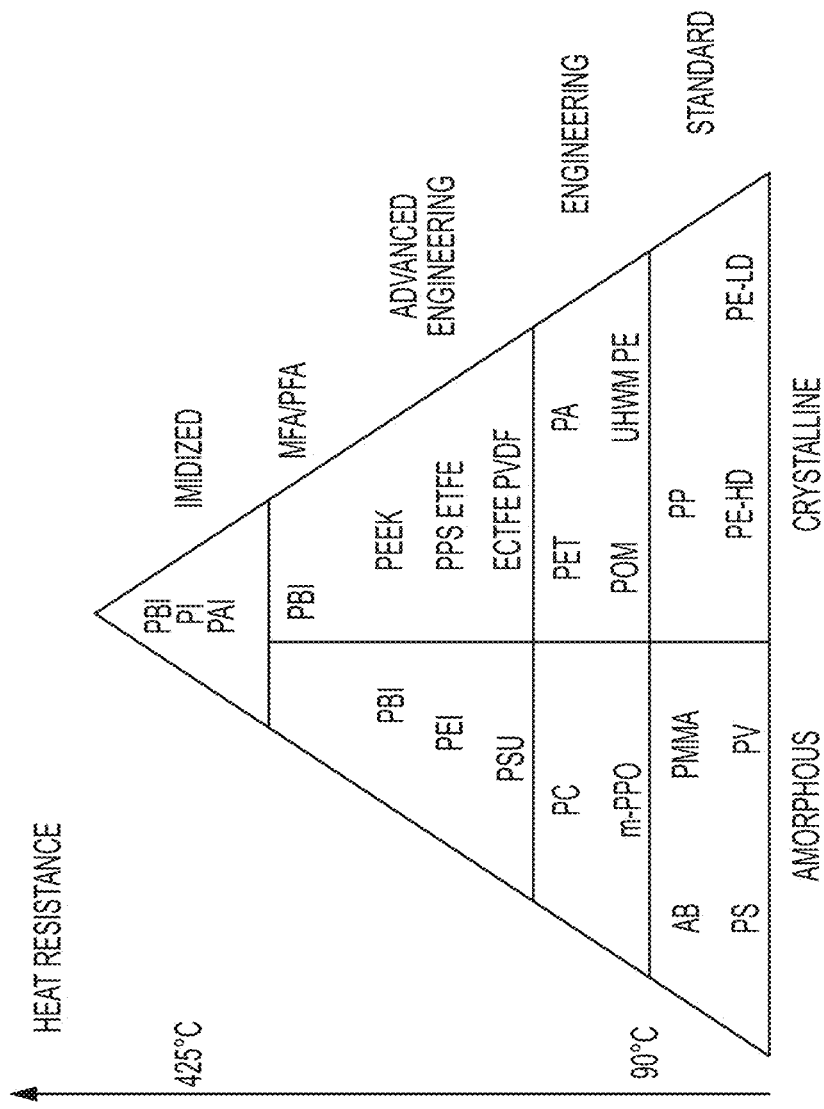
FIG. 1 is a depiction of thermoplastic polymers including thermoplastic polymers used in selective laser sintering.
Figure 2:
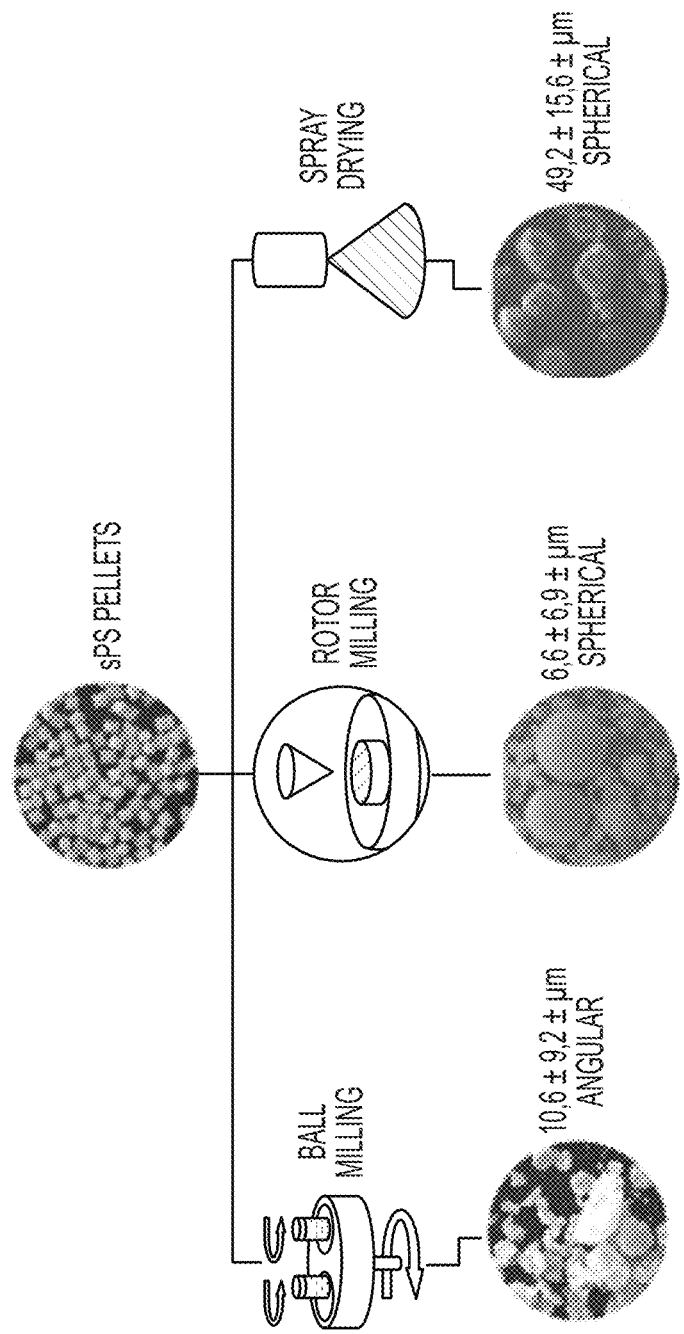
FIG. 2 is an illustration of results of syndiotactic polystyrene pellets processed into powder form using mechanical and physicochemical techniques.
Figure 3:
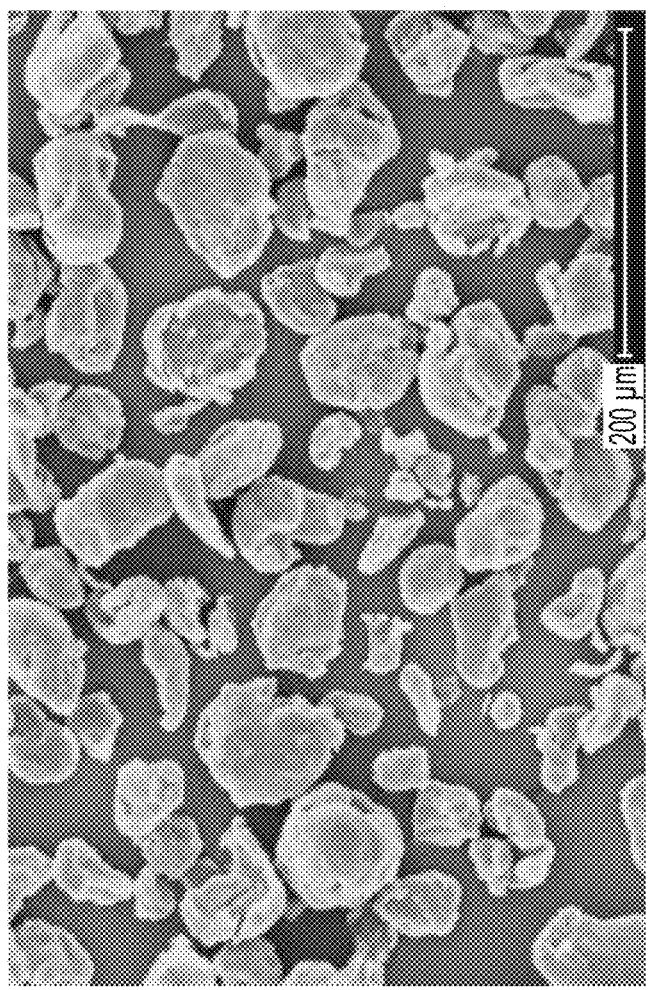
FIG. 3 is an illustration of DTM CastForm™ polystyrene raw powder.

Embodiments herein enable the processing of polystyrene into powder form suitable for SLS three-dimensional printing applications. A microprecipitation process is provided employing a water-miscible high boiling point solvent to dissolve the polystyrene and a polymeric dispersant to aid in polystyrene dispersibility. The polystyrene particles achieved with the process herein exhibit spherical morphology and have a wider distribution than most polyamides on the market. The large range permits better packing by filling the dead volume between larger particles with the smaller particles.

Microparticles of polystyrene are prepared via a microprecipitation process. Microprecipitation is a solvent displacement or interfacial deposition technique used to prepare micron-sized (micrometer sized) particles. In embodiments herein, a microprecipitation process comprises preparing a matrix-type colloidal particle synthesized from bimodal polystyrene. The process can include using a semi-polar to polar solvent that is miscible with water to form a lipophilic solution. The process is advantageously simple, avoids the use of large amounts of toxic solvents, enables attainment of micron-sized particles with narrow or large size distribution, depending, in embodiments, on selection of process parameters, and does not require a high energy input. In embodiments, SLS microparticles, in embodiments, microspheres of polystyrene, are formed by dropwise addition of water mixed with a polymeric stabilizer, as the precipitant, into a polystyrene polymer solution also containing a polymeric stabilizer and a water miscible solvent. The size and size distribution of the polystyrene microspheres can be determined or controlled by the selection of polymer and stabilizer concentrations, the stirring speed, and the precipitation temperature.

In embodiments, the process herein comprises combining polystyrene (that is, the polystyrene raw material to be processed) and a first solvent to form a polystyrene solution; heating the polystyrene solution; adding a second solvent and an optional precipitant to the polystyrene; optionally, stirring; whereby polystyrene microparticles are formed via microprecipitation; optionally, cooling the formed polystyrene microparticles in solution; and optionally, removing the first solvent and the second solvent.

Stirring can be performed at any suitable or desired speed. In embodiments, a stirring speed of from about 100 to about 650 rpm (revolutions per minute) is selected.

Precipitation temperature can be any suitable or desired temperature. In embodiments, a precipitation temperature is from about 60 to about 150° C.

The process herein can further comprise additional steps such as resuspending the formed polystyrene microparticles in water; mixing; and optionally, centrifuging; to form concentrated polystyrene microparticles.

The process herein can further comprise additional steps such as freezing the formed concentrated polystyrene microparticles; and optionally subjecting the freeze dried polystyrene microparticles to a vacuum to remove ice by sublimation.

The raw polystyrene material for the microprecipitation process can be any suitable or desired polystyrene. Polystyrene can be represented by the formula

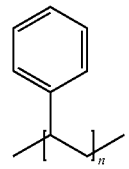

wherein n is an integer representing the degree of polymerization.

The relative stereochemical relationship of consecutive phenyl groups determines the tacticity of the polystyrene which has an effect on various physical properties of the material. A polymer is "atactic" when its pendant groups are arranged in a random fashion on both sides of a hypothetical plane through the polymer backbone (or main chain of the polymer). A polymer is "isotactic" when its pendant groups are arranged on the same side of the polymer chain. A polymer is "syndiotactic" when its pendant groups alternate on opposite sides of a hypothetical plane through the polymer backbone. For polystyrene, the diastereomer where all of the phenyl groups are on the same side is called isotactic polystyrene. The diastereomer where the phenyl groups are randomly distributed on both sides of the polymer chain is called atactic polystyrene. The diastereomer where the phenyl groups are ordered with the phenyl groups positioned on alternating sides of the hydrocarbon backbone is called syndiotactic polystyrene.

In embodiments, the raw polystyrene material selected for the microprecipitation process is syndiotactic polystyrene. In embodiments, syndiotactic stereoregularity predominates, in embodiments, wherein the polystyrene has a stereoregular structure of greater than 50 percent syndiotacticity as determined by $^{13}C$ NMR in terms of a racemic diad.

Weight average molecular weight can be measured by Gel Permeation Chromatography. In embodiments, a polystyrene having a weight average molecular weight of from about 38,000 to about 200,000 Daltons, or from about 40,000 to about 200,000 Daltons, or from about 40,000 to about 100,000 Daltons, or from about 45,000 to about 80,000 Daltons, is selected.

Figure 4:
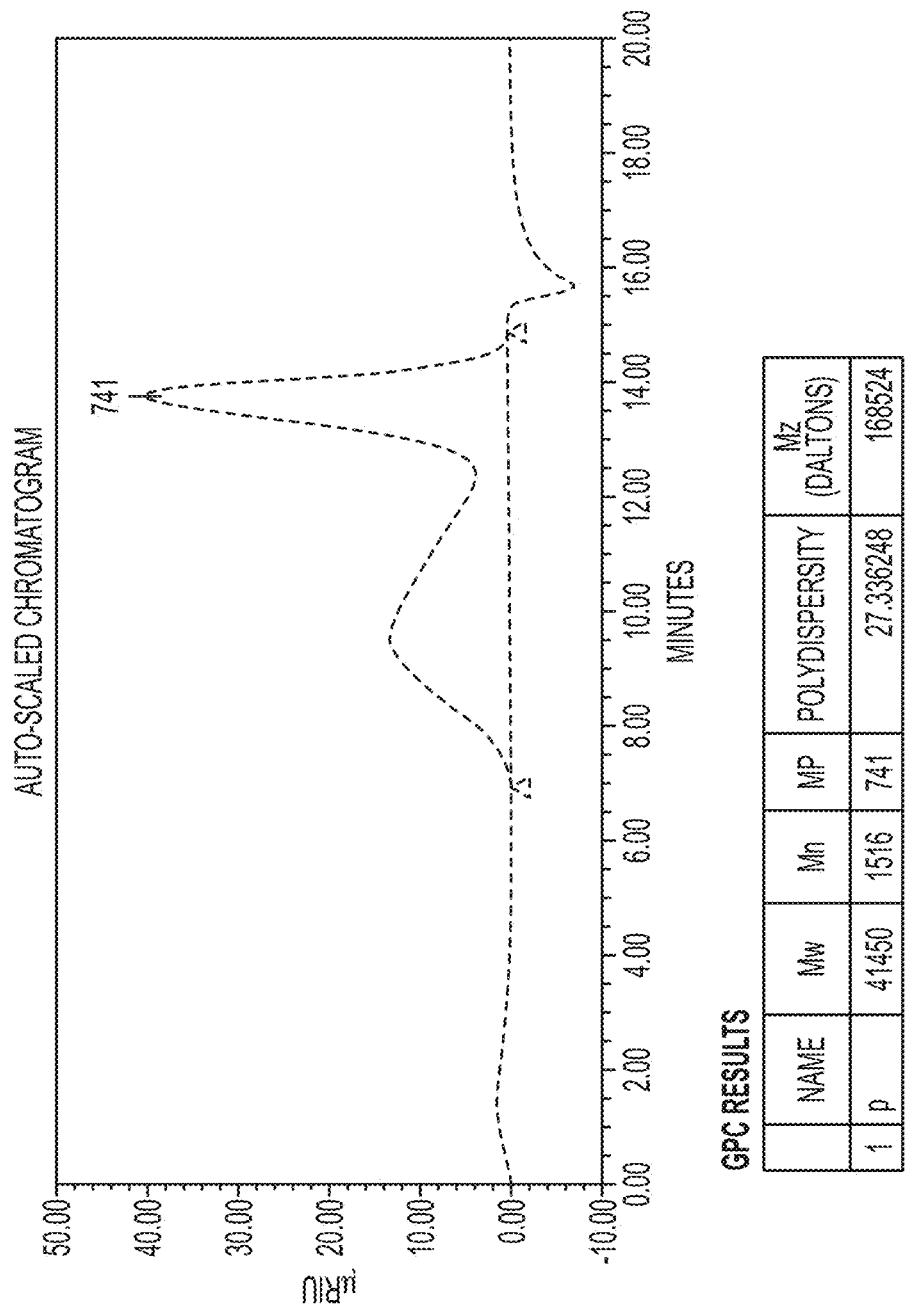
FIG. 4 is an auto-scaled chromatogram showing μRIU ($10^{-6}$ refractive index units, y-axis) versus minutes (x-axis), for a selected polystyrene used to make the particles herein.

FIG. 4 shows a trace of polystyrene that can be used to make particles. The auto-scaled chromatogram of FIG. 4 shows μRIU ($10^{-6}$ refractive index units) y-axis, versus minutes, x-axis, for a selected polystyrene used to make the particles herein.

Mn and polydispersity ranges provide evidence of bimodal properties. In embodiments, the raw polystyrene selected has a Mn of from about 500 to about 10,000, or from about 750 to about 5,000, or from about 1,000 to about 2,000.

In embodiments, the polystyrene particles prepared herein have a polydispersity of from about 8 to about 50, or from about 12 to about 40, or from about 15 to about 30.

In embodiments, the raw polystyrene selected has a melting point (Mp) of from about 180 to about 300° C., or from about 200 to about 270° C., or from about 210 to about 250° C.

The shape of the molecular weight distribution (MWD) has great influence over the end-use properties of the polymer resin. Reported techniques for the production of polymer resins with bimodal MWDs are based on the manipulation of certain operating conditions, such as the chain-transfer-agent concentration, among others. For further detail, see Lenzi, et al., "Producing Bimodal Molecular Weight Distribution Polymer Resins Using Living and Conventional Free-Radical Polymerization," *Ind. Eng. Chem. Res.*, 2005, 44 (8), pp 2568-2578, Publication Date (Web): Oct. 19, 2004, which is hereby incorporated by reference herein in its entirety.

In certain embodiments, the polystyrene selected is a polystyrene having a bimodal molecular weight distribution. In a specific embodiment, the polystyrene selected has a bimodal molecular weight distribution with an average molecular weight of 45,000 Daltons.

Glass transition temperature refers to the temperature at which an amorphous polymer or amorphous regions of a polymer is or are transformed, in a reversible way, from a viscous or rubbery condition to a hard and relatively brittle one. Glass transition temperature may be determined by differential scanning calorimetry (DSC).

In embodiments, the starting material or raw polystyrene has a glass transition temperature of from about 50 to about 120° C., or from about 50 to about 100° C., or from about 55 to about 90° C., as measured by the Differential Scanning Calorimeter.

Figure 6A:
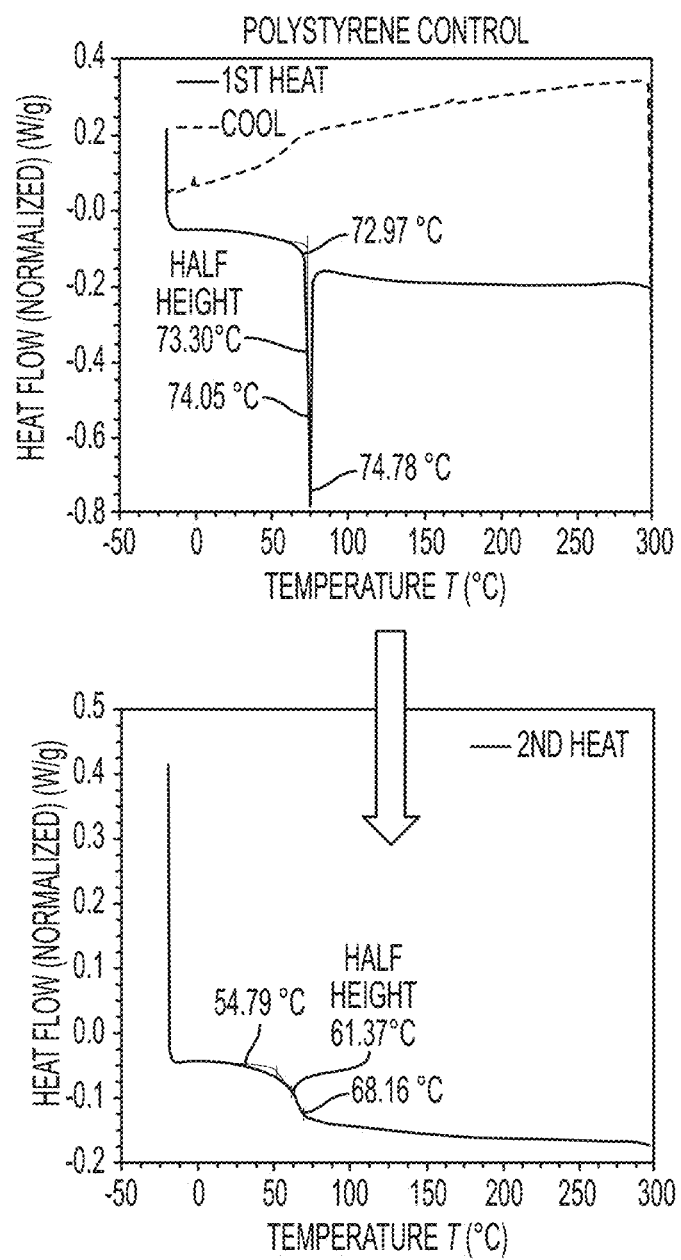
FIG. 6A illustrates Differential Scanning Calorimetry scans of polystyrene.
Figure 6B:
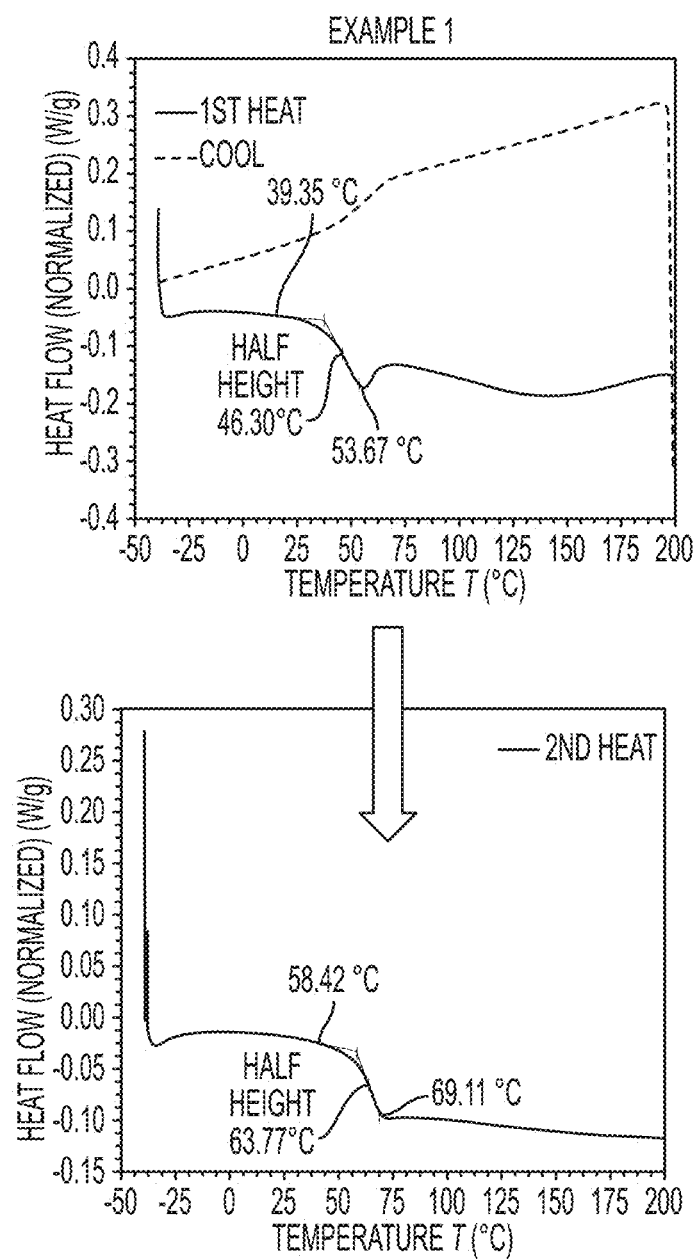
FIG. 6B illustrates Differential Scanning Calorimetry scans of polystyrene microparticles prepared in accordance with the present embodiments.
Figure 6C:
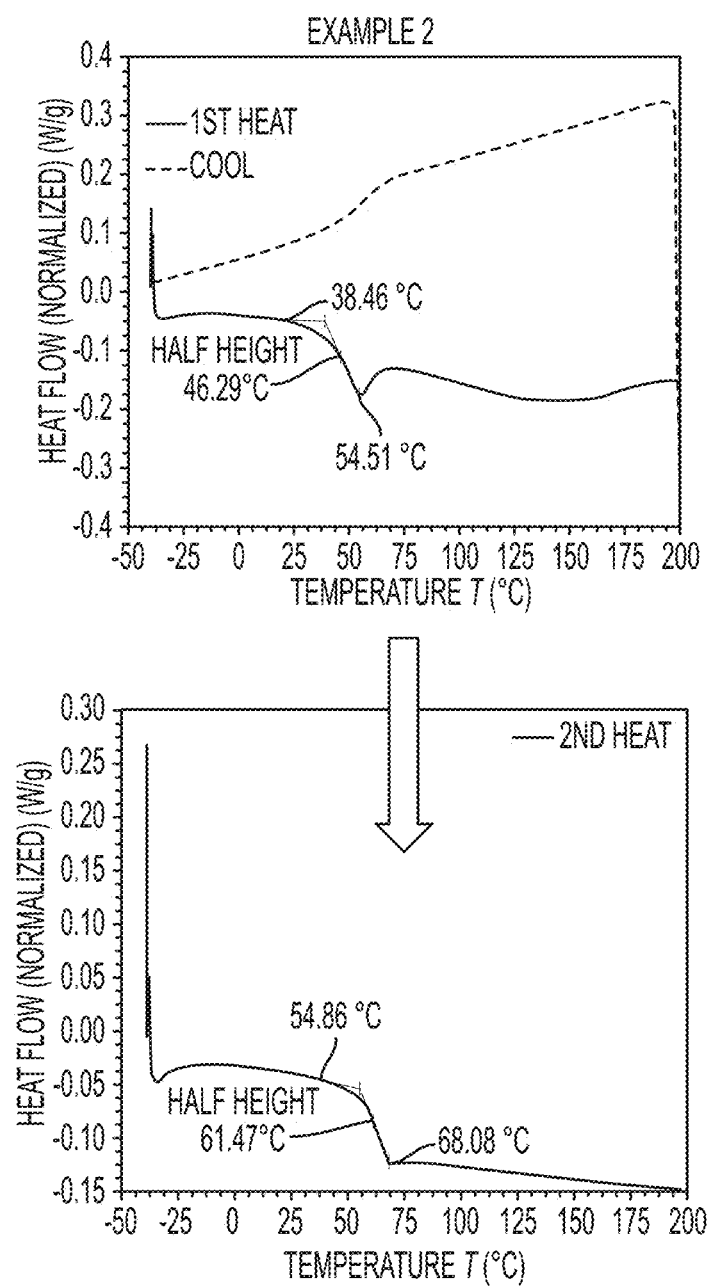
FIG. 6C illustrates Differential Scanning Calorimetry scans of polystyrene microparticles prepared in accordance with the present embodiments.

With respect to glass transition temperature, the first heat can be defined as that heat which removes the thermal history that the sample/polymer has undergone during its preparation; the next heating after the "first heat" shows the samples true or real thermal response. In embodiments, the raw polystyrene selected for the present process has a glass transition temperature (first heat) and the formed polystyrene microparticles have a glass transition temperature (first heat) that is different from the raw polystyrene glass transition temperature. Noting that technically it wouldn't be first heat in this case since particles were formed from raw polystyrene and during the particle formation the polymer undergoes heating, the DSCs in FIGS. 6A, 6B, and 6C show this well when you compare the polystyrene control (raw polystyrene) to Example 1 and Example 2, the first heats are different from control and really not first heats (no sharp transition in processed particles for their first heat).

In certain embodiments, the raw polystyrene has a glass transition temperature (first heat) and wherein the formed polystyrene microparticles have a glass transition temperature (first heat) that is from about 20 to about 35° C. lower than the raw polystyrene glass transition temperature.

The process herein provides a method for preparing large polystyrene microspheres for use as an SLS build material. In embodiments, the process for preparing polystyrene microparticles enables microparticles of greater than 10 microns wherein the microparticles are spherical, smooth, and robust.

The particle size of spherical particles can be described in terms of their diameter. Average particle size can be measured by Scanning Electron Microscopy which provides two-dimensional images of the microparticles. These images can be used to produce number-based size distributions by converting the SEM particle size data directly to cumulative number-based distributions. The particle size distribution data can be compared to appropriate reference distributions, such as Weibull, normal and lognormal distributions.

In embodiments, the formed polystyrene microparticles herein have a number-based average particle diameter of greater than 10 micrometers. In certain embodiments, the formed polystyrene microparticles have a number-based average particle diameter of from about 40 to about 100 micrometers. In a specific embodiment, the formed polystyrene microparticles have a number-based mean particle diameter of about 91 micrometers and a particle size range of from about 43 to about 313 micrometers.

The polystyrene particles achieved with the process herein exhibit spherical morphology and have a wider distribution than most polyamides on the market. The large range permits better packing by filling the dead volume between larger particles with the smaller particles. In embodiments, the formed polystyrene microparticles herein have a wide particle size distribution wherein the particle diameter ranges over a size range of from about 10 to about 1,000, or from about 20 to about 600, or from about 40 to about 400 micrometers.

The process herein employs a first solvent comprising a water miscible high boiling point or medium boiling point solvent. The first solvent can be any suitable or desired solvent. In embodiments, the first solvent is a water miscible high boiling point solvent having a boiling point of greater than about 150° C., a water miscible medium boiling point solvent having a boiling point of from about 100° C. to about 150° C., or a combination thereof.

According to various embodiments of the disclosure, any polymer that is soluble in the solvent or shows affinity to the polystyrene resin may be effective as a polymeric stabilizer.

In embodiments, the process comprises selecting polymeric stabilizers with affinity to polystyrene and the organic first solvent that the polystyrene is dissolved in before adding the second solvent, which, in embodiments, is water.

Non-limiting exemplary polymeric stabilizers may include poly(vinyl acetate), poly(methyl methacrylate), poly (acrylonitrile), poly(dimethylsiloxane), poly(vinyl chloride), poly(ethylene), poly(propylene), poly(lauryl methacrylate), poly(oxyethylene), poly(acrylamide), poly(vinyl alcohol), poly(acrylic acid), poly(methacrylic acid), poly (vinyl pyrrolidone), poly(ethylene imine), poly(vinyl methyl ether), poly(4-vinylpyridine), poly(12-hydroxystearic acid), poly(isobutylene), cis-1:4-poly(isoprene), carboxymethyl cellulose, gelatin, Tween™ 80, Tween™ 20, hydroxypropylmethylcellulose, copovidone and polyvinylpyrrolidone, polyethyleneglycols (PEG), polymethacrylates, hypromellose acetate succinate, hypromellose phthalate, polyvinyl caprolactam-polyvinyl acetate-polyethylene glycol graft copolymer such as Soluplus®, polyvinyl acetate phthalate, cellulose acetate phthalate, and combinations thereof. In certain embodiments, the polymeric stabilizer is polyvinyl alcohol, and in certain embodiments, the polystyrene and polymeric stabilizer may be dissolved at an elevated temperature, such as a temperature ranging from about 95° C. to about 105° C.

The water-miscible organic "first" solvent may be chosen from those known in the art, such as, for example, alcohol, acetic acid, acetone, and acetamides, such as dimethyl acetamide. In certain exemplary embodiments, the water-miscible organic solvent is dimethyl acetamide (DMAc).

A second solvent comprising a water-soluble polymer, such as polyvinyl alcohol, may be prepared in water as an aqueous dispersion. Other water-soluble polymers that may be envisioned include, for example, polyvinyl alcohol, PEG and block copolymers containing PEG, such as, for example, poly(propylene oxide), poly(ethylene butylene), and poly(caprolactone); polyvinyl pyrrolidone, also known as povidone, polyvinyl pyrrolidone-vinyl acetate copolymer; polyacrylic acid; poly(acrylic acid) copolymers modified with block-copolymers of poly(ethylene oxide) and poly(propylene oxide); polyacrylamides; N-(2-hydroxypropyl) methacrylamide; divinyl ether-maleic anhydride; poly (2-alkyl-2-oxazolines); polyphosphoesters such as polyphosphates and polyphosphonates; water-soluble polyphosphazenes such as poly[di(carboxylatophenoxy) phosphazene] and poly[dimethoxyethoxyethoxy)phosphazene]; natural water soluble polymers such as xanthan gum, pectin, N-carboxymethylchitosan, dextran, carrageenan, guar gum, cellulose ethers such as hydroxypropylmethyl cellulose, hydroxypropyl cellulose, hydroxyethyl cellulose and sodium carboxy methyl cellulose, hyaluronic acid, albumin, starch and starch-based derivatives; water-soluble polymers of N-vinylcarboxamides; and hydrophilic, anionic, and cationic surfactants. In certain embodiments, the water-soluble polymer is polyvinyl alcohol.

In certain embodiments, the first solvent is selected from the group consisting of dimethyl acetamide, acetic acid, diethylene glycol dimethyl ether, dimethyl formamide, 1,4-dioxane, ethylene glycol, hexamethyl phosphoramide, hexamethyl phosphorous triamide, pyridine, water, and combinations thereof.

The second solvent can be any suitable or desired solvent. In embodiments, the second solvent is selected from the group consisting of water, n-butanol, n-propanol, isopropyl alcohol, ethanol, acetic acid, acetonitrile, ethyl acetate, and combinations thereof. In embodiments, the second solvent comprises water a polymeric stabilizer selected from the group consisting of polyvinyl alcohol, poly(vinyl acetate), poly(methyl methacrylate), poly(acrylonitrile), poly(dimethylsiloxane), poly(vinyl chloride), poly(ethylene), poly (propylene), poly(lauryl methacrylate), poly(oxyethylene), poly(acrylamide), poly(vinyl alcohol), poly(acrylic acid), poly(methacrylic acid), poly(vinyl pyrrolidone), poly(ethylene imine), poly(vinyl methyl ether), poly(4-vinylpyridine), poly(12-hydroxystearic acid), poly(isobutylene), cis-1:4-poly(isoprene), carboxymethyl cellulose, gelatin, hydroxypropylmethylcellulose, copovidone and polyvinylpyrrolidone, polyethyleneglycols (PEG), polymethacrylates, hypromellose acetate succinate, hypromellose phthalate, polyvinyl caprolactam-polyvinyl acetate-polyethylene glycol graft copolymer, polyvinyl acetate phthalate, cellulose acetate phthalate, and combinations thereof.

In embodiments, the second solvent comprises water and a precipitant. In certain embodiments, the second solvent comprises water and a water soluble polymer stabilizer.

Also provided herein is a polystyrene microparticle formed by a microprecipitation process, wherein the polystyrene particle has a spherical morphology, an average particle diameter of greater than about 10 micrometers as measured by scanning electron microscopy, and a weight average molecular weight of from about 40,000 to about 100,000 Daltons as measured by gel permeation chromatography. In embodiments, the polystyrene microparticle is formed from a bimodal molecular weight distribution polystyrene.

Also provided is a method of selective laser sintering comprising providing polystyrene microparticles formed by a microprecipitation process; and exposing the microparticles to a laser to fuse the microparticles. Any polystyrene microparticle described herein can be selected for the method of selective laser sintering herein. In certain embodiments, the polystyrene microparticle is formed from a bimodal molecular weight distribution polystyrene. In certain embodiments, the polystyrene microparticles have a wide particle size distribution of from about 20 to about 600 micrometers.

Figure 5:
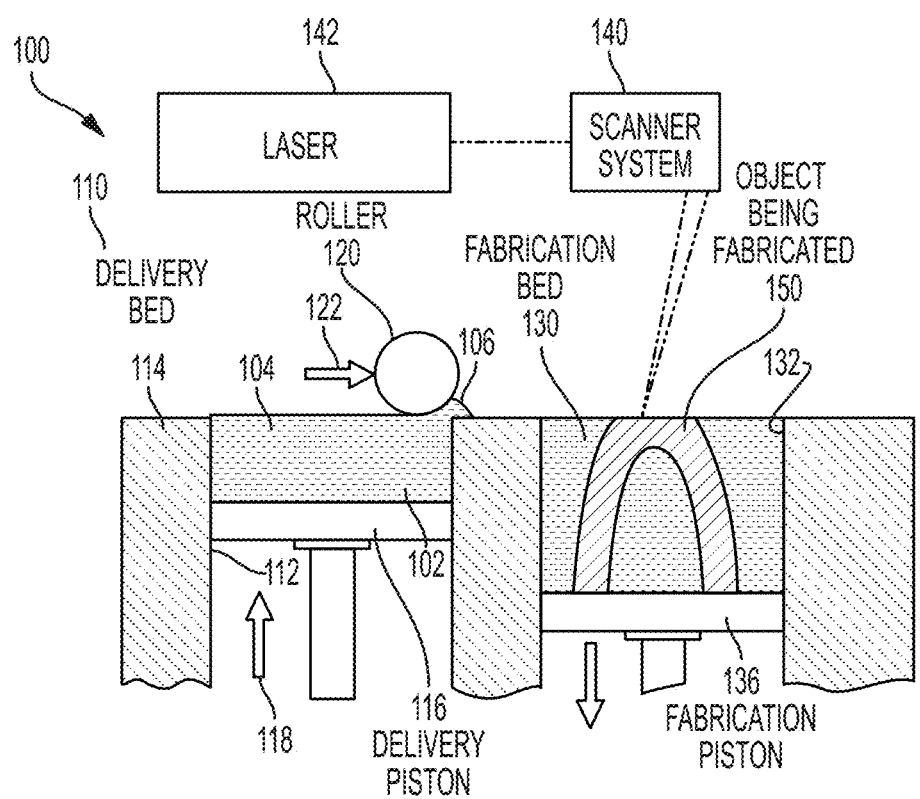
FIG. 5 illustrates a three dimensional SLS printer employing polystyrene microparticles of the present disclosure

FIG. 5 depicts an illustrative three dimensional printer 100 for printing three dimensional objects according to one or more embodiments disclosed herein. The printer 100 may include a delivery bed 110 defined by one or more sidewalls 112 and a delivery piston 116. The microparticles 102 may be loaded into the delivery bed 110 in dry power and/or paste form. Once loaded, the upper surface 104 of the microparticles 102 may be even with or below the upper surface 114 of the sidewall 112. The delivery piston 116 may then move upwards in the direction of arrow 118 until the upper surface 104 of the microparticles 102 is even with or above the upper surface 114 of the sidewall 112.

A transfer member (for example, a roller) 120 may then transfer a portion 106 of the microparticles 102 above the upper surface 114 of the sidewall 112 from the delivery bed 110 into a fabrication bed 130 (for example, in the direction of the arrow 122). The fabrication bed 130 may be defined by one or more sidewalls 132 and a fabrication piston 136. The transferred portion 106 of the microparticles 102 may form a first layer in the fabrication bed 130 that has a thickness from about 10 micrometers (μm) to about 50 μm, or from about 50 μm to about 100 μm, or from about 100 μm to about 240 μm, or any other suitable thickness.

A scanning system 140 may scan the microparticles 102 in the first layer, and a laser 142 may then sinter the first layer in response to the scan results. The laser 142 may be a continuous wave laser or a pulse laser. When the laser 142 is a pulse laser, the pulse length and intervals may be adjusted for proper sintering. For example, when the microparticles 102 in the form of a paste are used in the printing process, the pulses may have a relatively long interval (for example, from about 100 milliseconds to about 5 seconds) to allow time for the diluent to at least partially evaporate. The sintering may take place at a temperature less than or equal to about 200° C., a temperature less than or equal to about 150° C., a temperature less than or equal to about 125° C., or a temperature less than or equal to about 100° C., or any other suitable temperature.

Once the first layer has been sintered in the fabrication bed 130, the delivery piston 116 may then move upwards again in the direction of the arrow 118 until the upper surface 104 of the microparticles 102 is again even with or above the upper surface 114 of the sidewall 112 of the delivery bed 110. The fabrication piston 136 may move downwards. The transfer member 120 may then transfer another portion of the microparticles 102 that are above the upper surface 114 of the sidewall 112 from the delivery bed 110 into the fabrication bed 130 to form a second layer that is on and/or over the first layer. The laser 142 may then sinter the second layer. This process may be repeated until the desired three dimensional object is produced.

The three dimensional printer 100 as shown in FIG. 5 is exemplary only and any type of SLS printer can be employed.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Polystyrene beads transformed into spherical microparticles in accordance with the present embodiments were sourced from Scientific Polymer Products, Inc. The lot of polystyrene had a bimodal distribution with an average molecular weight of 45,000 Daltons. The density of the polymer is 1.05 g/cm$^3$.

Table 1 provides components of polystyrene microspheres for Examples 1 and 2 prepared in accordance with the present disclosure.

TABLE 1

|  | Example 1 | Example 2 |
| --- | --- | --- |
| Polystyrene Supplier | Scientific Polymer Products, Inc. (Bimodal polystyrene); Mw about 45,000 | |
| Amount Polystyrene | 60.0 grams | 70.5 grams |
| Amount Polyvinyl alcohol (PVA) | 20.0 grams (78K) | 39.6 grams (78K) |
| Ratio of polystyrene to PVA in organic phase | 3:1 | 1.78:1 |
| Amount Dimethylacetamide (DMAc) | 325.9 grams | 356.5 grams |
| Weight % and amount of PVA aqueous solution added | 1.7 weight %/324.8 grams (78K) | 1.9 weight %/338.8 grams (78K) |
| Ratio of polystyrene to DMAc | 0.18:1 | 0.20:1 |
| Average particle size by SEM (scanning electron microscopy) | 91 ± 31 μm Range: 43-313 μm | 283 ± 65 μm Range: 144-537 μm |

Synthesis of polystyrene microspheres. Into a 1 Liter, three-necked round bottom flask was added 60 grams of polystyrene and 20 grams of polyvinyl alcohol (78K, PVA) in dimethyl acetamide (DMAc, 325.9 grams, water miscible, high boiling solvent). This polymer solution was heated up to 100° C. and a solution of PVA in deionized water (5.52 grams PVA in 324.8 grams DIW) was added dropwise to the flask with a metering pump (Fluid Metering, Inc.) while stirring at 290 rpm (revolutions per minute). After about 10 minutes of adding the aqueous PVA solution, the solvent solution went from clear light yellow to a white opaque. After about 3 hours the aqueous PVA solution was all added and the heat was turned off. The opaque solution was left to cool and left stirring overnight at 240 rpm. Next day, the solution was transferred to a 1 Liter centrifuge bottle and centrifuged at 3,000 rpm for 15 minutes to remove the DMAc/DIW mixture. The particles was resuspended in DIW and mixed by shaking for about 30 seconds before centrifuging again at 3,000 rpm for 15 minutes. This wash/centrifuge procedure was repeated one more time before concentrating particles and transferring to a freeze-drier bottle. The particle slurry was rapidly frozen and then placed on a freeze drier which subjected the bottled particles to a high vacuum that removes ice by sublimation.

Analytical and microscopy results. Analytical data shown in Table 2—DSC (differential scanning calorimetry), GPC (gel permeation chromatography), and TGA (thermal gravimetric analysis)—confirm that the raw polystyrene pellets and processed polystyrene microparticles have not changed in any drastic way. The first heat of the DSC analysis does show a major difference in glass transition of almost 30° C. between the starting polystyrene and the processed polystyrene samples due to thermal history each polymer has undergone. After both the raw polystyrene and processed microparticles are reheated using the same DSC process, the thermal history is eliminated and similar glass transition temperatures are more apparent. When the first heat is used as a method of detection, the obtained material is thus traceable and easily differentiated from the polystyrene particles in their original raw form.

TABLE 2

|  | Polystyrene (unprocessed) | Example 1 | Example 2 |
| --- | --- | --- | --- |
| 1$^{st}$ Tg (mid) | 73.30° C. | 46.30° C. | 46.29° C. |
| 1$^{st}$ Tg (off) | 74.05° C. | 53.67° C. | 54.51° C. |
| 1$^{st}$ Tg (on) | 72.97° C. | 39.35° C. | 38.46° C. |
| 2$^{nd}$ Tg (mid) | 61.37° C. | 63.77° C. | 61.47° C. |
| 2$^{nd}$ Tg (off) | 68.16° C. | 69.11° C. | 68.08° C. |
| 2$^{nd}$ Tg (on) | 54.79° C. | 58.42° C. | 54.86° C. |
| TGA - onset | 350.02° C. | 348.71° C. | 349.88° C. |
| TGA - Organic | 99.67% weight loss | 99.91% weight loss | 99.63% weight loss |
| TGA - Residue | 0.16% weight loss | 0.14% weight loss | 0.27% weight loss |
| Mwt. | 41,450 | 41,800 | 41,830 |
| Mn. | 1,516 | 1,530 | 1,530 |
| Mp. | 741 | 740 | 740 |
| Mz. | 168,524 | 170,270 | 172,110 |
| PD | 27.34 | 27.29 | 27.34 |

Differential Scanning Calorimetry (DSC) scans of raw polystyrene and of the prepared polystyrene microspheres of Examples 1 and 2 are shown in FIGS. 6A, 6B, and 6C. FIGS. 6A, 6B, and 6C show the original DSC scans of the $1^{st}$ heats (or glass transitions, Tg) of the three materials compared to the $2^{nd}$ heats (or glass transitions, Tg). FIGS. 6A, 6B, and 6C clearly illustrate the differences in thermal properties of the materials during first heat cycle of test.

Figure 7:
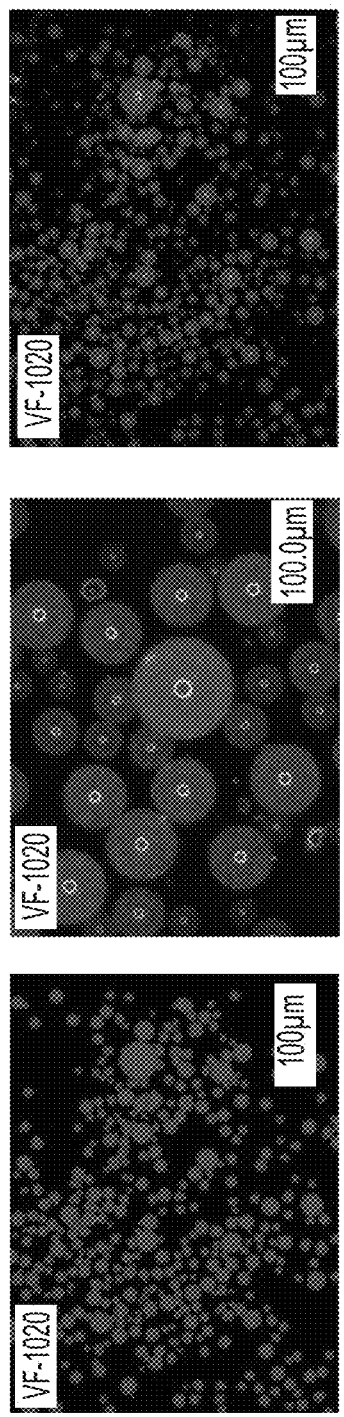
FIG. 7 is an illustration of digital microscope images of polystyrene microparticles prepared in accordance with the present embodiments.
Figure 8B:
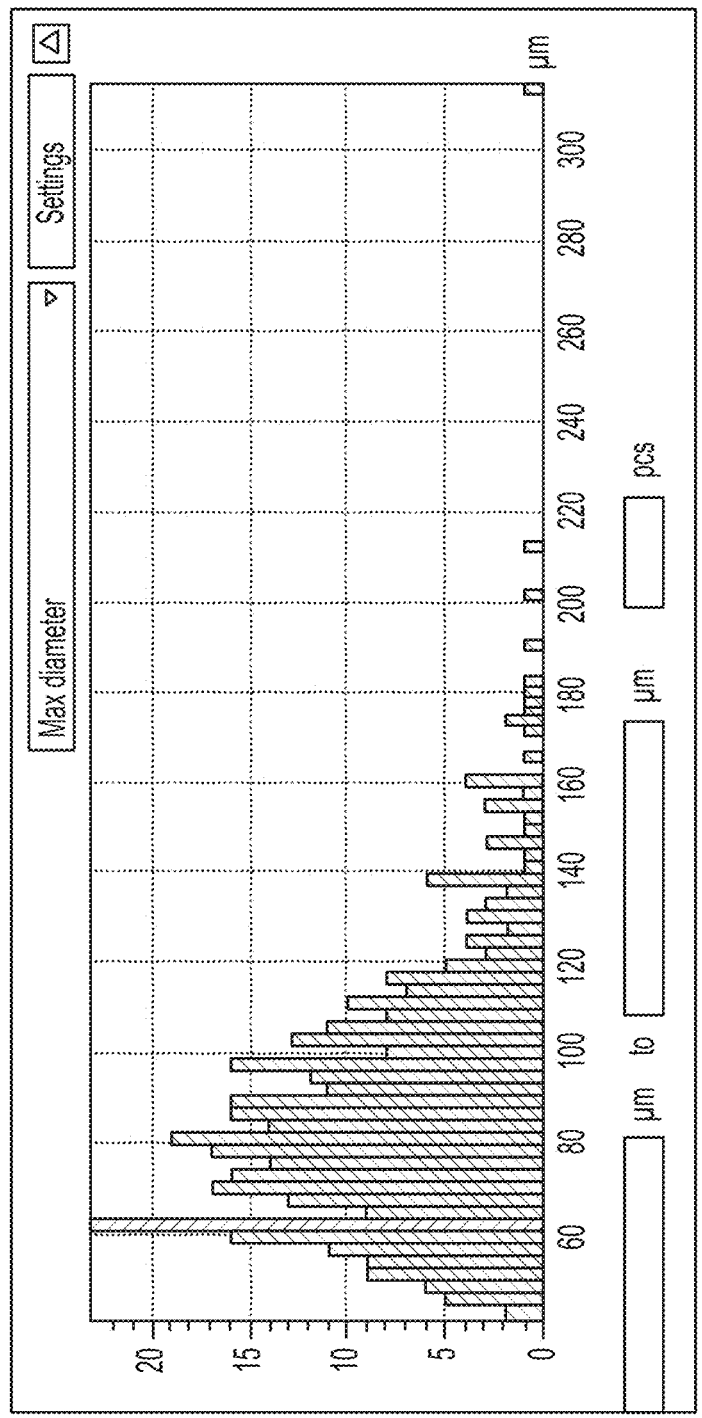
FIG. 8B is a graph showing particle size distribution of polystyrene microparticles prepared in accordance with the present embodiments.

FIG. 7 is an illustration of digital microscope images of the polystyrene microparticles of Example 1. FIG. 8A is an image analysis of the polystyrene microparticles of Example 1. FIG. 8B is graph of the polystyrene microparticles particle size distribution of Example 1.

Figure 9:
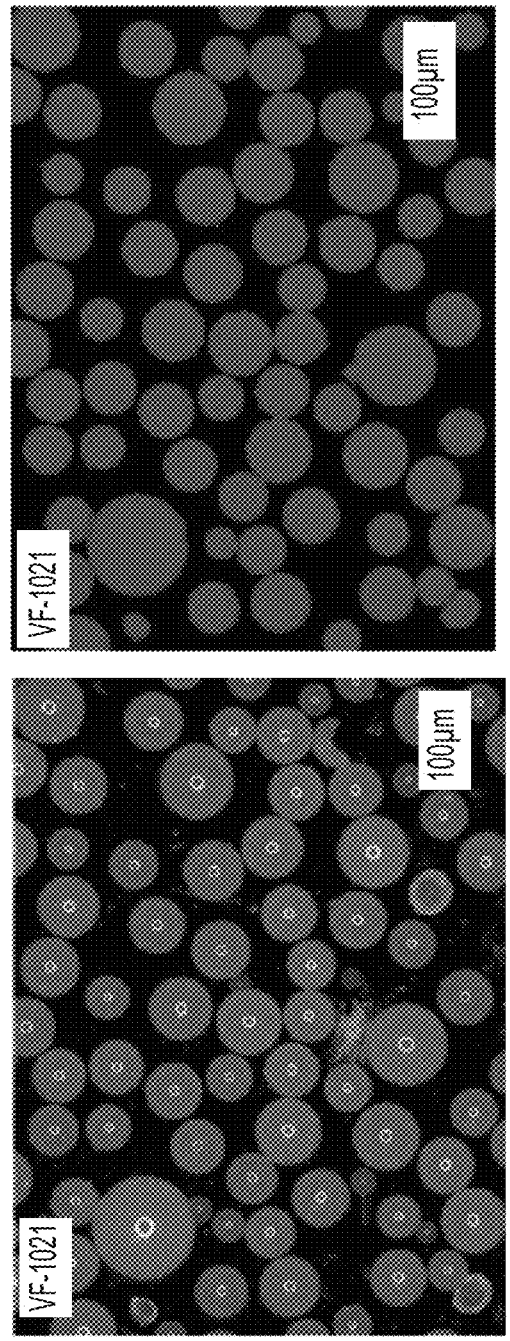
FIG. 9 is an illustration of digital microscope images of polystyrene microparticles prepared in accordance with the present embodiments.
Figure 10B:
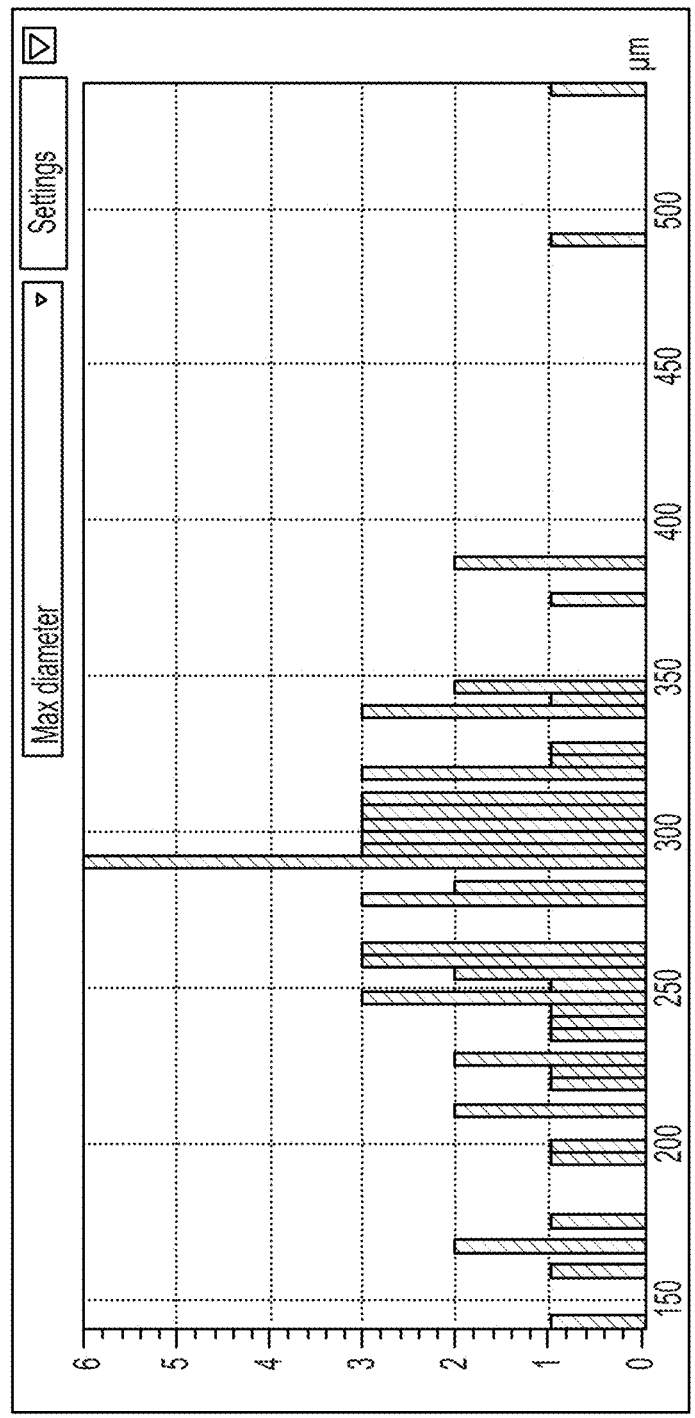
FIG. 10B is a graph showing particle size distribution of polystyrene microparticles prepared in accordance with the present embodiments.

FIG. 9 is an illustration of digital microscope images of the polystyrene microparticles of Example 2. FIG. 10A is an image analysis of the polystyrene microparticles of Example 2. FIG. 10B is graph of the polystyrene microparticles particle size distribution of Example 2.

Figure 11:
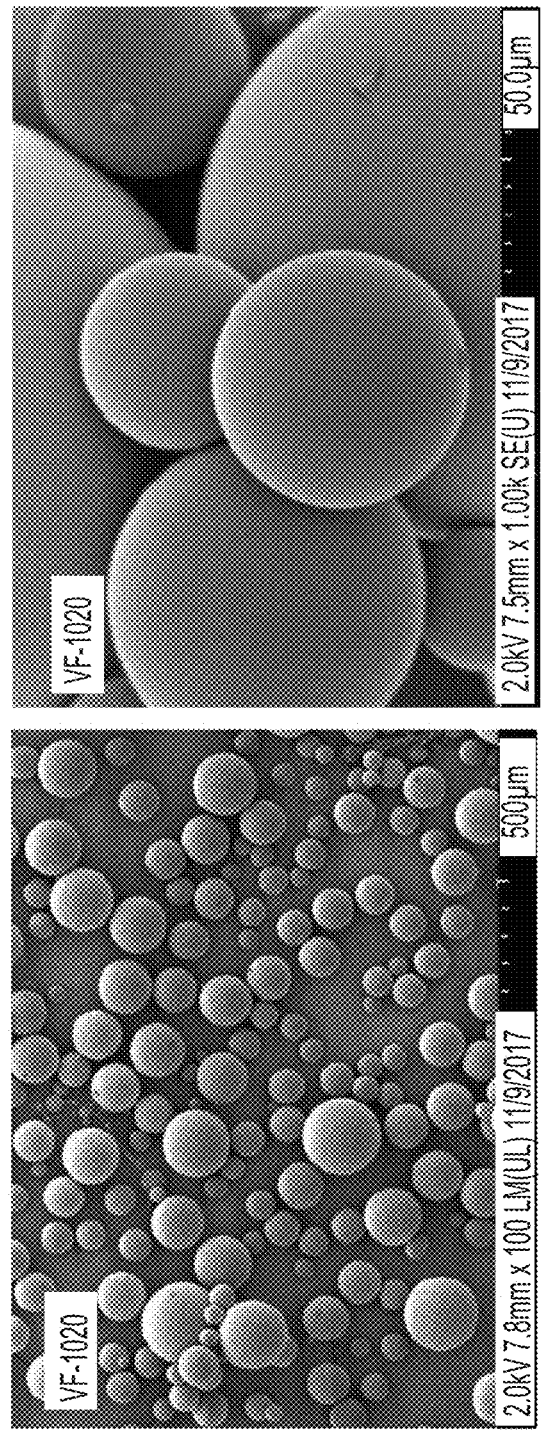
FIG. 11 is an illustration of a scanning electron microscope image of polystyrene microparticles prepared in accordance with the present embodiments.

FIG. 11 is an illustration of a scanning electron microscope image of the polystyrene microparticles of Example 1.

Figure 12:
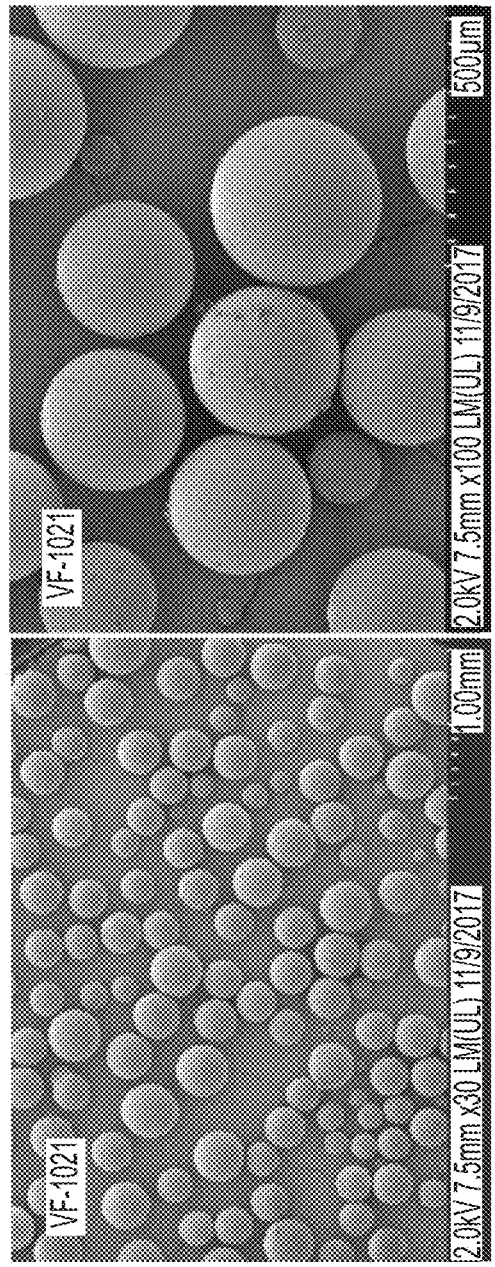
FIG. 12 is an illustration of a scanning electron microscope image of polystyrene microparticles prepared in accordance with the present embodiments.

FIG. 12 is an illustration of a scanning electron microscope image of the polystyrene microparticles of Example 2.

SLS Printing Results. Testing of particles for sintering was performed using the Sharebot SnowWhite Printer which is based on selective laser sintering (SLS). This printer uses thermoplastic powders that are created into three-dimensional objects which are fabricated from a digital file in CAD. The polymer powder is sintered and fused into thin layers at the same time which enables the construction of small objects with excellent definition. The printer uses a $CO_2$ laser allowing it to sinter a wide range of powders such as nylons.

The polystyrene microparticles were sieved through a 150 micron screen and applied onto an aluminum plate. A 40 mil gap bar coater was then used to level out particles into an approximately 1 millimeter thick layer of powder. The particles were then placed in the SnowWhite chamber and the printer process settings were adjusted accordingly.

Motors were disabled. Temperature control was based on powder properties, in this case 50° C. Powder bed temperature was adjusted for each material (5° C. below the Tg of the particles). Build chamber set temperature was 23° C. (not controlled). Wait Time was 1,200 seconds (allowed temperature to stabilize). Laser rate was 40,000 or 50,000. Laser power was varied (30% or 60%). The chamber/powder was allowed to cool before removing the part.

FIG. 13 shows images of the sintered layer at 60% laser power and 30,000 laser rate. Example 1 sintered better than Example 2, with particle size and particle size distribution believed to be the main reason for the better sintering performance of Example 1. The particle size distribution of Example 1 is narrower than that of Example 2 and the mean particle size of Example 1 is about three times smaller than that of Example 2 which allows better heat transfer and flow between particles. Number-weighted particle size distribution via microscopic image analysis show that the span or measured width (breadth) of the distribution was narrower and shifted to a smaller size range than that of Example 2.

Thus, a water based precipitation process to make large polystyrene microspheres for use as an SLS build material is provided. In embodiments, a process for preparing polystyrene microparticles greater than 10 microns wherein the microparticles are spherical, smooth, and robust is provided. In embodiments, a bimodal distribution molecular weight polystyrene is selected as the raw material for the process herein for preparing the polystyrene microparticles. The polystyrene microparticles prepared by the process herein are particularly suitable for sintering applications and in particular for selective laser sintering applications. In embodiments, the polystyrene microparticles provide an amorphous material that can be successfully sintered without shrinkage or breakage issues.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A process comprising:
    combining polystyrene, wherein the polystyrene is a bimodal molecular weight distribution polystyrene, wherein the polystyrene has a weight average molecular weight of from about 40,000 to about 100,000 Daltons, and a first solvent to form a polystyrene solution;
    heating the polystyrene solution;
    adding a second solvent to the polystyrene solution with optional stirring whereby polystyrene microparticles are formed via microprecipitation;
    optionally, cooling the formed polystyrene microparticles in solution; and
    optionally, removing the first solvent and second solvent.

2. The process of claim 1, further comprising:
    resuspending the formed polystyrene microparticles in water;
    mixing; and
    optionally, centrifuging;
    to form concentrated polystyrene microparticles.

3. The process of claim 2, further comprising;
    freezing the formed concentrated polystyrene microparticles; and
    optionally subjecting the freeze dried polystyrene microparticles to a vacuum to remove ice by sublimation.

4. The process of claim 1, wherein the polystyrene has a weight average molecular weight of from about 45,000 to about 80,000 Daltons.

5. The process of claim 1, wherein the polystyrene has a glass transition temperature (first heat) and wherein the formed polystyrene microparticles have a glass transition temperature (first heat) that is different from the polystyrene glass transition temperature.

6. The process of claim 1, wherein the polystyrene has a glass transition temperature (first heat) and wherein the formed polystyrene microparticles have a glass transition temperature (first heat) that is from about 20 to about 35° C. lower than the polystyrene glass transition temperature.

7. The process of claim 1, wherein the formed polystyrene microparticles have a number based average particle diameter of from about 40 to about 100 micrometers.

8. The process of claim 1, wherein the formed polystyrene microparticles have a number-based mean particle diameter of about 91 micrometers and a particle size range of from about 43 to about 313 micrometers.

9. The process of claim 1, wherein the formed polystyrene microparticles have a wide particle size distribution of from about 20 to about 600 micrometers.

10. The process of claim 1, wherein the first solvent is a water miscible high boiling point solvent having a boiling point of greater than about 150° C., a water miscible medium boiling point solvent having a boiling point of from about 100° C. to about 150°, or a combination thereof.

11. The process of claim 1, wherein the first solvent is selected from the group consisting of dimethyl acetamide, diethylene glycol dimethyl ether, dimethyl formamide, 1,4-dioxane, ethylene glycol, hexamethyl phosphoramide, hexamethyl phosphorous triamide, pyridine, and combinations thereof.

12. The process of claim 1, wherein the second solvent comprises water and a polymeric stabilizer.

13. The process of claim 1, wherein the second solvent comprises water and a polymeric stabilizer selected from the group consisting of polyvinyl alcohol, poly(vinyl acetate), poly(methyl methacrylate), poly(acrylonitrile), poly(dimethylsiloxane), poly(vinyl chloride), poly(ethylene), poly(propylene), poly(lauryl methacrylate), poly(oxyethylene), poly(acrylamide), poly(vinyl alcohol), poly(acrylic acid), poly(methacrylic acid), poly(vinyl pyrrolidone), poly(ethylene imine), poly(vinyl methyl ether), poly(4-vinylpyridine), poly(12-hydroxystearic acid), poly(isobutylene), cis-1:4-poly(isoprene), carboxymethyl cellulose, gelatin, hydroxypropylmethylcellulose, copovidone and polyvinylpyrrolidone, polyethyleneglycols (PEG), polymethacrylates, hypromellose acetate succinate, hypromellose phthalate, polyvinyl caprolactam-polyvinyl acetate-polyethylene glycol graft copolymer, polyvinyl acetate phthalate, cellulose acetate phthalate, and combinations thereof.

14. The process of claim 1, wherein the formed polystyrene microparticles have a polydispersity of from about 8 to about 50.

15. A polystyrene microparticle formed by the process of claim 1, wherein the polystyrene microparticle has a spherical morphology, a particle diameter of greater than about 10 micrometers.

16. A method of selective laser sintering comprising:
providing polystyrene microparticles formed by the process of claim 1; and
exposing the microparticles to a laser to fuse the microparticles.

17. The method of claim 16, wherein the polystyrene microparticles have a wide particle size distribution of from about 20 to about 600 micrometers.

* * * * *